United States Patent [19]
Andrews et al.

[11] Patent Number: 6,032,165
[45] Date of Patent: Feb. 29, 2000

[54] METHOD AND SYSTEM FOR CONVERTING MULTI-BYTE CHARACTER STRINGS BETWEEN INTERCHANGE CODES WITHIN A COMPUTER SYSTEM

[75] Inventors: Gregory Paul Andrews; Patrick Leo Glenski, both of Rochester, Minn.

[73] Assignee: International Business Machines Corporation, Armonk, N.Y.

[21] Appl. No.: 08/795,504

[22] Filed: Feb. 5, 1997

[51] Int. Cl.[7] .............................. G06F 1/02; G06F 3/023
[52] U.S. Cl. ......................... 707/536; 707/535; 711/220
[58] Field of Search .................................. 707/535, 536; 709/1; 711/207, 220, 221

[56] References Cited

U.S. PATENT DOCUMENTS

| | | | |
|---|---|---|---|
| 3,577,142 | 5/1971 | McMillin | 341/90 |
| 4,594,587 | 6/1986 | Chandler et al. | 345/516 |
| 4,701,746 | 10/1987 | Ueda et al. | 340/347 |
| 5,309,358 | 5/1994 | Andrews et al. | 364/419.01 |
| 5,633,632 | 5/1997 | Ido et al. | 341/58 |

Primary Examiner—Stephen S. Hong
Assistant Examiner—Cong-Lac Huynh
Attorney, Agent, or Firm—Antony P. Ng; Andrew J. Dillon

[57] ABSTRACT

A method for converting a multi-byte dataword in a first extended interchange code to a multi-byte dataword in a second extended interchange code is disclosed. In accordance with the method and system of the present invention, multiple offset arrays and a conversion matrix are provided. Each entry in each of the offset arrays contains an offset index for indexing to the conversion matrix. First, an index value is returned from a corresponding one of the offset arrays, for each byte of a multi-byte dataword in a first interchange code. Then, all of the returned index values are added together to obtain a multi-byte dataword in a second interchange code from the conversion matrix.

15 Claims, 4 Drawing Sheets

METHOD AND SYSTEM FOR CONVERTING MULTI-BYTE CHARACTER STRINGS BETWEEN INTERCHANGE CODES WITHIN A COMPUTER SYSTEM

CROSS-REFERENCE TO A RELATED PATENT

The present invention is related to the subject matter of a U.S. Pat. No. 5,309,358, entitled "Method for Interchange Code Conversion of Multi-Byte Character String Characters," and assigned to the assignee herein named. The content of the above-mentioned United States Patent Application is incorporated by reference herein.

BACKGROUND OF THE INVENTION

1. Technical Field

The present invention relates to a method and system for data processing in general and, in particular, to a method and system for exchanging information between data-processing systems. Still more particularly, the present invention relates to a method and system for converting a multi-byte dataword in a first interchange code to a multi-byte dataword in a second interchange code.

2. Description of the Prior Art

Within a data-processing system, all the alphabets (or characters) of a national language can be encoded by a set of character codes known as interchange codes. For most languages, the number of character codes required within a set of interchange codes are relatively small. For example, merely 52 character codes are required for representing all 26 alphabets of the English language, including both upper and lower cases. An addition of only seven more character codes are required for representing all the German alphabets, allowing for three vowel-receiving diaeresis (including upper and lower cases) and the β symbol. Similar minor additions of character codes enable French, Dutch, Spanish, Italian, Portuguese, and several other Scandinavian languages to be encoded separately within an individual interchange code set. Hence, it is quite sufficient to provide one byte (or eight bits) for encoding all the alphabets within any one of the above-mentioned national languages. In addition to alphabets, single-byte encoding also allows a set of ten digits for expressing numbers, a variety of punctuation symbols, and other specialized symbols such as various national monetary symbols (e.g. $, £, ¥) for the purpose for which they are intended. Currently, there are two standard sets of interchange codes for each single-byte encodable national language, namely, the American National Standard Code for Information Interchange (ASCII) and the Extended Binary-Coded Decimal Interchange Code (EBCDIC).

Not surprisingly, there are also national languages that contain more than 256 alphabets, or more precisely, characters. For example, the traditional written Chinese language consists of in excess of 13,000 characters, and the Japanese language consists of 3,000 to 8,000 ideographs (known as kanji characters) and several hundred other symbols for the numerical, hiragana, and katakana characters. Thus, each set of interchange codes for any one of the national languages that have a large character base must utilize two bytes (or 16 bits) for encoding one character. This allows for the expression of a maximum of $2^{16}$=65,536 characters, excluding digits, punctuation symbols, etc. As in single-byte interchange code sets, there is also more than one standard set of interchange code for double-byte encodable languages. For example, there are four different interchange code sets for the Japanese language that are currently being utilized— IBM Host Code, IBM PC Code, Kanji Assigned Number Code, and JIS (Japanese Industrial Standard) Code. Similarly, there are five different interchange code sets for the Korean language and two different interchange code sets for the Traditional Chinese language.

Because several sets of interchange codes are in common usage today, the need for code conversion among different interchange code sets frequently arises. For example, the IBM PC Code, which is an extension of the ASCII for encoding Japanese characters, is typically utilized in IBM-compatible personal computers, while the IBM Host Code, which is a similar extension of the EBCDIC, is typically utilized in various midrange and mainframe computers. In order to provide information interchange between any two of the above-mentioned data-processing systems, each having a different set of interchange codes, a consistency in application of meaning to the symbolic code exchanged is required.

For a single-byte encodable language, conversion from one set of interchange codes to another requires a single conversion table. In theory, the concept of a conversion table may also be applied to double-byte conversion. In application, unfortunately, such an approach would take up considerably more memory than for a single-byte encodable language. For example, the size of a typical conversion table for a single-byte encodable language is 256 bytes in length, while the size of a typical conversion table for a double-byte encodable language would be in excess of 128 Kilobytes in length.

Further, the traditional methods for double-byte code set conversion utilize a series of language-dependent comparisons against the individual double-byte characters to determine their validity. These steps are, in essence, a series of range comparisons. Once the validity of the character has been established, a language-dependent method is utilized to derive array indices for the character into a 256-entry-by-256-entry conversion array of double-bytes. The array indices are then utilized to recover the appropriate character from the translation array. U.S. Pat. No. 5,309,358 to Andrews et al., teaches a method that simplifies the range-comparison and indices-generating portions of the traditional method. The present disclosures provide additional improvements to the method as taught under Andrews in U.S. Pat. No. 5,309,358, such that conversion time can be further reduced.

SUMMARY OF THE INVENTION

In view of the foregoing, it is therefore an object of the present invention to provide an improved method and system for data processing.

It is another object of the present invention to provide an improved method and system for exchanging information between data processing systems.

It is yet another object of the present invention to provide an improved method and system for converting a multi-byte dataword in a first interchange code to a multi-byte dataword in a second interchange code.

In accordance with the method and system of the present invention, multiple offset arrays and a conversion matrix are provided. Each entry in each of the offset arrays contains an offset index for indexing to the conversion matrix. First, an index value is returned from a corresponding one of the offset arrays, for each byte of a multi-byte dataword in a first interchange code. Then, all of the returned index values are added together to obtain a multi-byte dataword in a second interchange code from the conversion matrix.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be executed in a variety of computers under a number of different operating systems. The computer may be, for example, a personal computer, a midrange computer, or a mainframe computer. In addition, the computer may be a stand-alone system or part of a network such as a local-area network (LAN) or a wide-area network (WAN).

Figure 1:
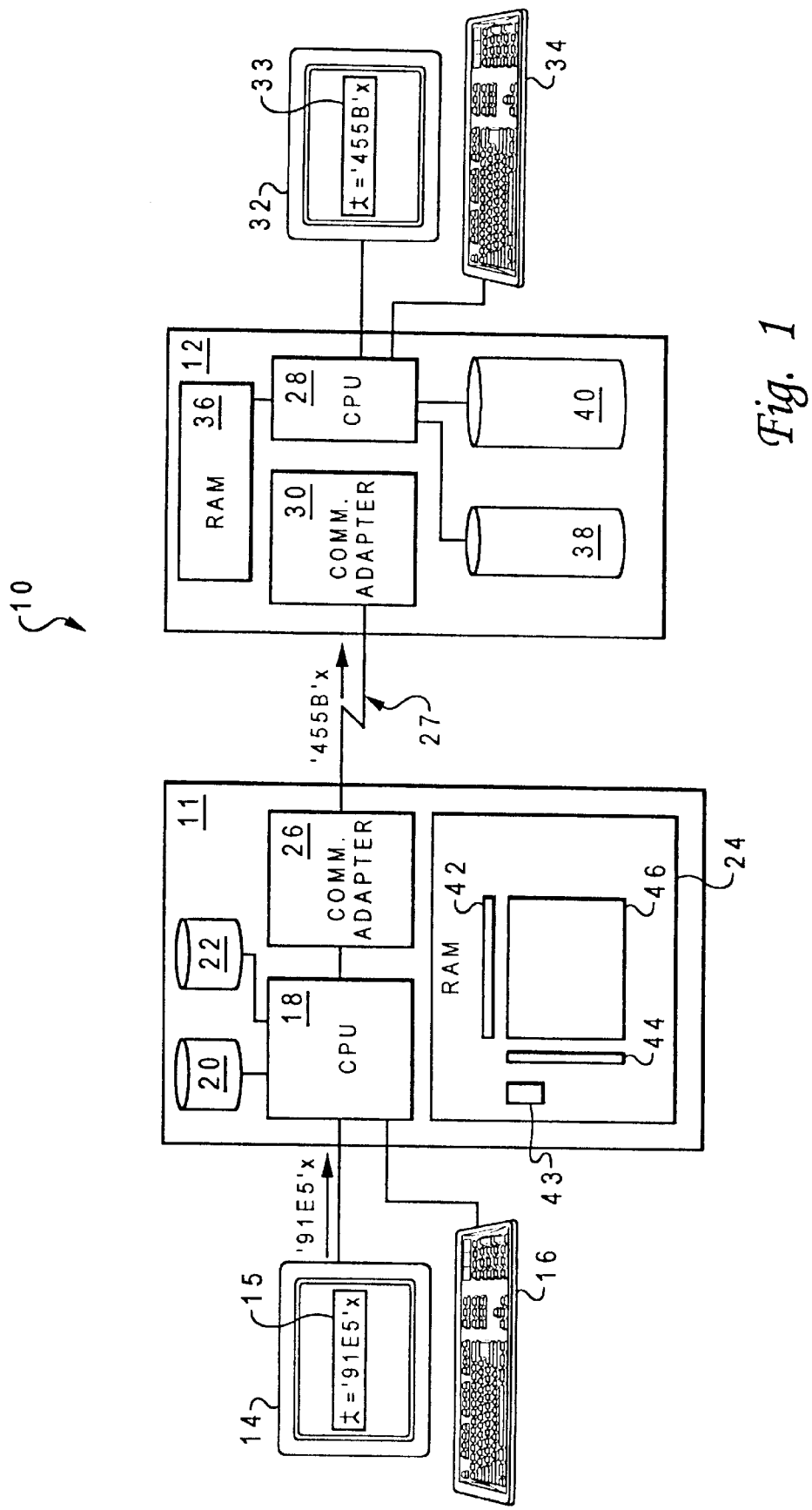
FIG. 1 is a block diagram of a distributed data-processing system in which a preferred embodiment of the present invention may be utilized.

Referring now to the drawings and in particular to FIG. 1, there is depicted a block diagram representation of a distributed data-processing system in which a preferred embodiment of the present invention may be utilized. As shown, distributed data-processing system 10 may include a personal computer system 11, such as an Aptiva™ manufactured by International Business Machines Corporation, and a midrange computer system 12, such as an AS/400™ also manufactured by International Business Machines Corporation. A user interface for personal computer system 11 includes a display device 14 and a keyboard 16. A kanji character for the concept "BIG" and its IBM PC Code in double-byte character string $91E5_{hex}$ are depicted in box 15 on display device 14.

Display device 14 is under the control of a central processing unit (CPU) 18 within computer system 11. Keyboard 16 provides for user inputs to computer system 11. Also accessible to CPU 18 are direct-access storage devices (DASDs) 20, 22 and a system memory 24. A communications adaptor 26 provides an interface to a communications link 27 over a network between computer system 1 1 and computer system 12.

Computer system 12 may operate as a host device for serving network workstations such as computer system 11. Computer system 12 includes a CPU 28, which receives data over communications link 27 through a communications adaptor 30. CPU 28 controls a display device 32 and receives user inputs through a keyboard 34. Displayed in a box 33 on display device 32 is the kanji character for the concept "BIG" and its IBM Host Code in double-byte character string $455B_{hex}$. Computer system 12 further includes system memory 36 and DASDs 38, 40.

Character strings transmitted between computer system 11 and computer system 12 must be converted between two sets of interchange codes (i.e., IBM PC Code and IBM Host Code) if information represented by the strings is not to be lost or completely garbled. As an example, conversion of the character string for the kanji character of the concept "BIG" will be considered. In a preferred embodiment, such conversion occurs in a network workstation such as computer system 11. Residing within system memory 24 of computer system 11 are, inter alia, a program 43 for the conversion of IBM PC Code double-byte character strings to IBM Host Code double-byte character strings, a first-byte offset array 42, a second-byte offset array 44, and a conversion matrix 46, all for the use by the conversion program under the present invention.

Figure 2:
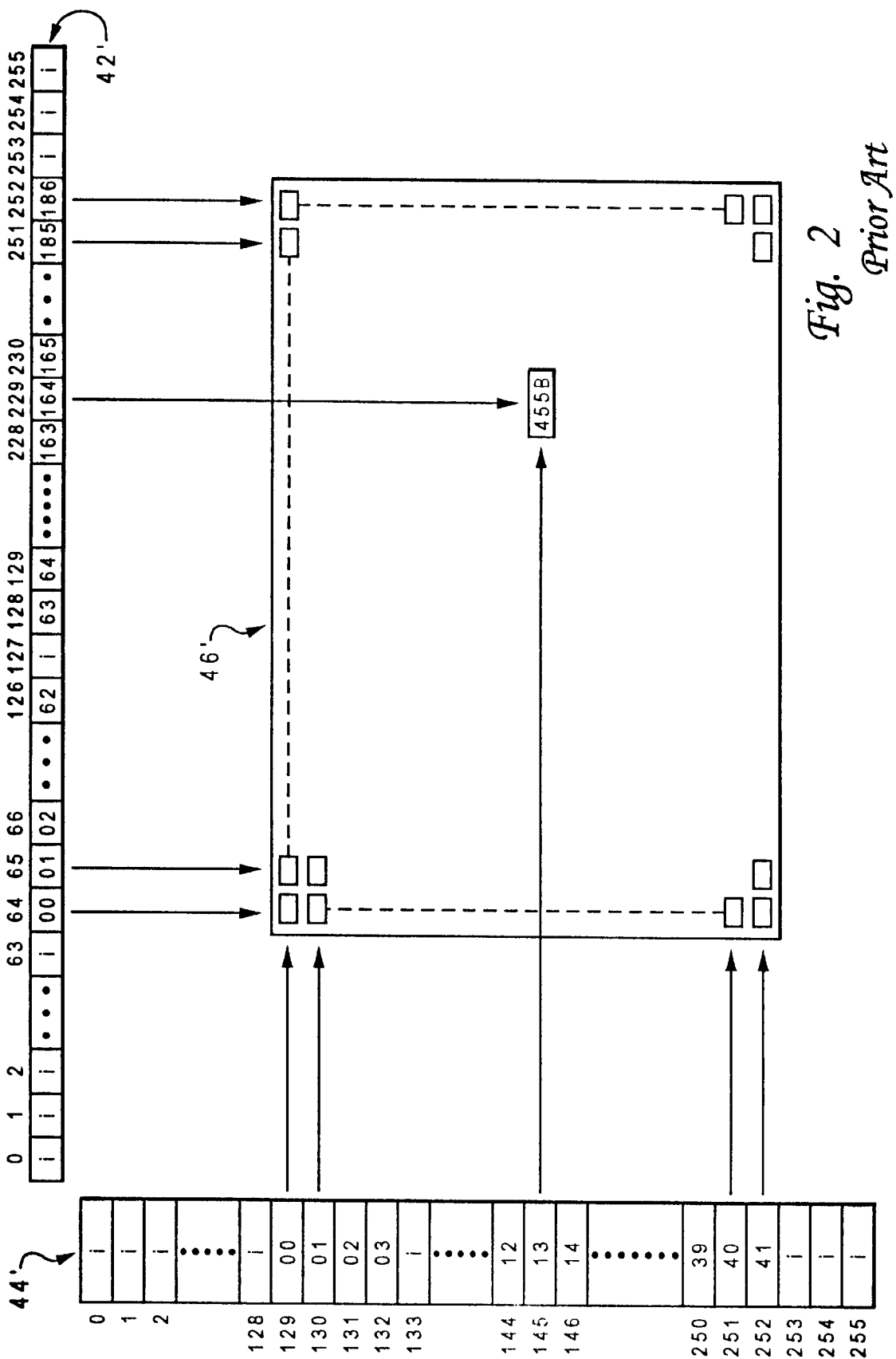
FIG. 2 is a block diagram of a first-byte verification table, a second-byte verification table, and a conversion table, under the prior art.

With reference now to FIG. 2, there is depicted a block diagram of a first-byte verification table, a second-byte verification table, and a conversion table, under the prior art. Initially, a first-byte verification table 42', a second-byte verification table 44', and a conversion table 46' are stored within system memory 24 of computer system 11. During operation, a verification is made to ensure a first byte of a double-byte dataword in a first interchange code is within the range of verification table 42'. Similarly, another verification is made to ensure a second byte of the double-byte interchange code is within the range of verification table 44'. If both verifications are valid, then an index value is returned from each of verification tables 42' and 44' according to the first byte and second byte inputs mentioned above. By utilizing the two returned index values, a double-byte dataword in a second interchange code can be obtained from conversion table 46'.

A specific example of converting the kanji symbol "BIG" from IBM PC Code to IBM Host Code is shown in FIG. 2. Under IBM PC Code, a double-byte dataword for the kanji symbol "BIG" is $91E5_{hex}$. The first byte $91_{hex}$ (229 in decimal) is verified against verification table 42', while the second byte $E5_{hex}$ (145 in decimal) is verified against verification table 44'. Because both $91_{hex}$ and $E5_{hex}$ are within the range of their respective verification tables, an index value is returned from each of verification tables 42' and 44'. By utilizing index value "164" from verification table 42' and index value "13" from verification table 44', a double-byte dataword in a second interchange code of IBM Host Code is obtained from conversion table 46' as $455B_{hex}$. Incidentally, $455B_{hex}$ is the IBM Host Code for the kanji symbol "BIG."

Under the prior art, the location of the double-byte dataword in a second interchange code from conversion table 46' is obtained by location=T[A[byte1]][B[byte2]]

In terms of coding, conversion table 46' is actually accessed by location=T[(A[byte1]×sizeof(row))+(B[byte2]×sizeof(column))]

Hence, the prior art method requires two multiplications and one addition to access the location in conversion table 46'. The present disclosure describes a method that eliminates the two multiplication steps and thereby improves the overall performance of the conversion process.

Figure 3:
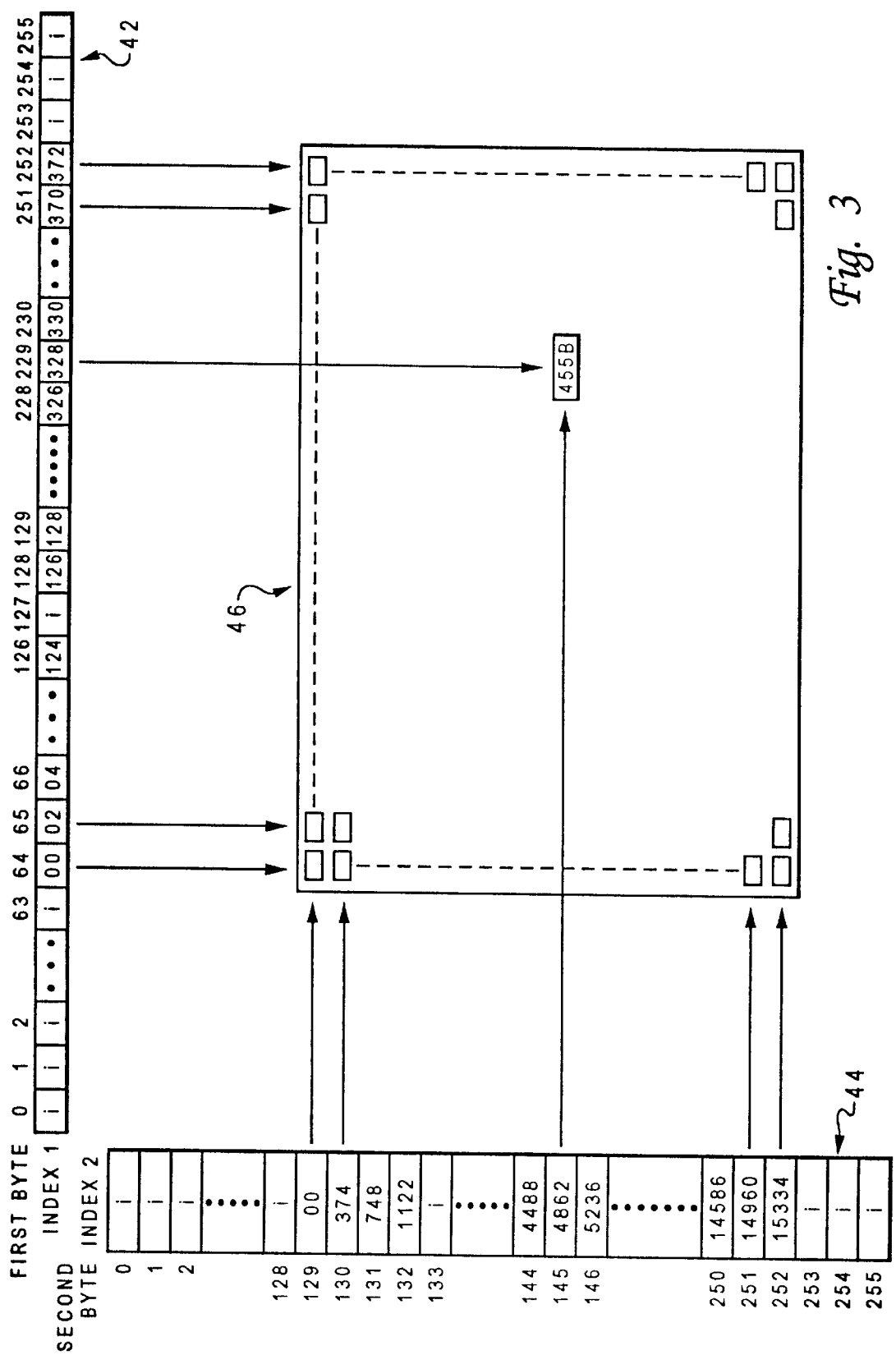
FIG. 3 is a block diagram of a first-byte offset array, a secondbyte offset array, and a conversion matrix, in accordance with a preferred embodiment of the present invention.

Referring now to FIG. 3, there is illustrated a block diagram of a first-byte offset array, a second-byte offset array, and a conversion matrix, in accordance with a preferred embodiment of the present invention. As shown, first-byte offset table 42 is a 256×8-bit array, each entry containing an offset index to each column of conversion matrix 46. In this example, each offset index in offset table 42 is preferably two bytes offset from each other, e.g., "00,"

"02," "04," "06," "08," etc. Second-byte offset table 44 is a 256×16-bit array, each entry also containing an offset index to each row of conversion matrix 46. Each offset index in offset table 44 preferably offsets from each other by the row length of conversion matrix 46. In this example, the row length of conversion matrix 46 is 374 bytes, and the location of IBM Host Code 455B$_{hex}$ within conversion matrix 46 can be obtained by adding index 1 (328) from offset table 42 to index 2 (4862) from offset table 44.

Figure 4:
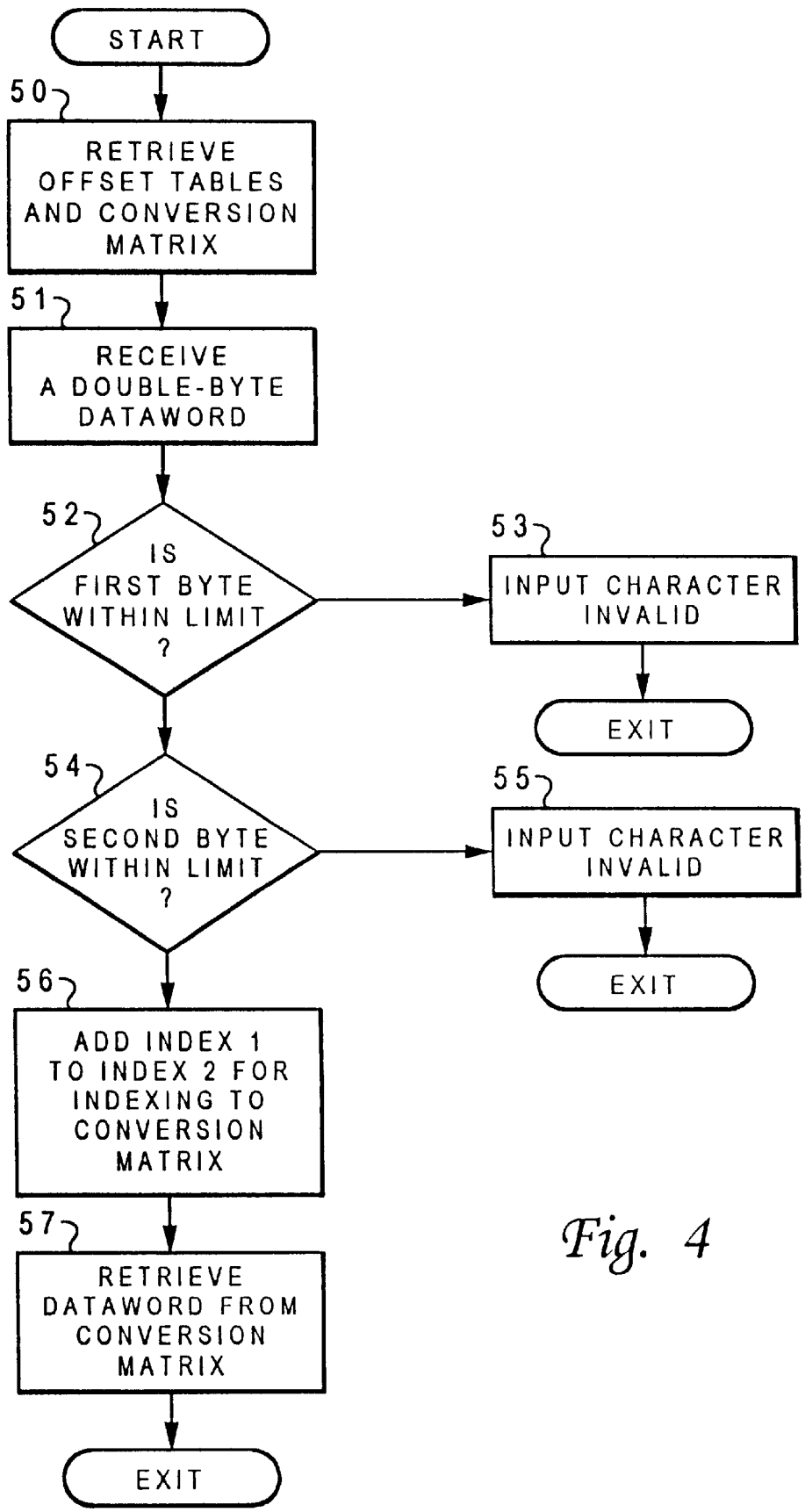
FIG. 4 is a high-level flow diagram of a method for converting a multi-byte dataword in a first interchange code to a multi-byte dataword in a second interchange code.

With reference now to FIG. 4, there is depicted a high-level flow diagram of a method for converting a multi-byte dataword in a first extended interchange code to a multi-byte dataword in a second extended interchange code, in accordance with a preferred embodiment of the invention. This method can be performed by a software program within the system memory, such as program 43 depicted in FIG. 1. The process begins upon receipt of a source double-byte dataword in a first interchange code. The type of interchange code desired for the target double-byte dataword is determined by an identification of a destination computer system. Before the conversion, a first-byte offset table 42, a second-offset table 44, and a conversion matrix 46, including range limits and trigger values for special functions, are retrieved from DASD 20 or 22 to be placed in system memory 24, as shown in block 50. While one program may be utilized for the conversion of all languages and interchange codes, the tables, range limits, and possibly the trigger values are specific to each national language and its corresponding interchange codes. After receiving a double-byte dataword in a first interchange code for conversion, as depicted in block 51, a determination is then made as to whether or not a first byte of the received double-byte dataword is within the range of offset table 42, as shown in block 52. If the first byte of the double-byte dataword in the first interchange code is not within the range of offset table 42, the double-byte dataword is considered as invalid, as depicted in block 53, and the process exits at this point.

Otherwise, if the first byte of the double-byte dataword in the first interchange code is within the range of offset table 42, another determination is made as to whether or not a second byte of the double-byte dataword in the first interchange code is within the range of offset table 44, as shown in block 54. If the second byte of the double-byte dataword in the first interchange code is not within the range of offset table 44, the double-byte dataword is again considered as invalid, as depicted in block 55, and the process exits at this point.

If the second byte of the double-byte dataword in the first interchange code is within the range of offset table 44, the location of a doublebyte dataword in a second interchange code within conversion matrix 46 is obtained by adding an index_1 from offset table 42 to index_2 from offset table 44, as illustrated in block 56. Subsequently, the double-byte dataword in a second interchange code is retrieved from conversion matrix 46, as shown in block 57. Finally, the process exits.

As has been described, the present invention provides an improved method for converting a double-byte dataword in a first interchange code to a double-byte dataword in a second interchange code. The present invention provides a single program, executed utilizing a unique national language conversion and several offset tables, for character conversion between interchange codes for Korean, Japanese, Traditional Chinese and Simplified Chinese. In accordance with a preferred embodiment of the invention, the conversion array for the Japanese language, including all kanji, hiragana katakana, and numeric characters, and the two offset arrays for one-way conversion only occupy approximate 16 Kbytes of the system memory.

While the present disclosure has been shown to convert double-byte character representations from one interchange code to another, the bytes that are converted need not represent displayable characters. In fact, the bytes may represent items from any set of meaningful values. The advantage of the present invention excels when the meaningful values are not consecutive. Just as the invention teaches a method for converting double-byte datawords, the invention can be expanded to convert multiple-byte datawords from one interchange code to another. The double-byte conversion utilizes two offset arrays and a twodimensional conversion matrix. Accordingly, a triple-byte dataword conversion would utilize three offset arrays and a three-dimensional conversion array. Similarly, this method can be further expanded to any n-byte dataword conversion.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include but not limited to recordable type media such as floppy disks or CD ROMs, and transmission type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for converting a multi-byte dataword in a first extended interchange code to a multi-byte dataword in a second extended interchange code, said method comprising the steps of:

providing a plurality of offset arrays and a conversion matrix, wherein each entry in each of said plurality of offset arrays contains an offset index for indexing to said conversion matrix, wherein in each offset array, a difference between offset indices in each pair of adjacent entries is greater than one;

returning an index value for each byte of said multi-byte dataword in said first extended interchange code from a corresponding one of said plurality of offset arrays; and adding all of said returned index values to obtain said multi-byte dataword in said second extended interchange code from said conversion matrix.

2. The method according to claim 1, wherein said method further includes a step of verifying each byte of said multi-byte dataword in said first extended interchange code is within the range of said corresponding one of said plurality of offset arrays.

3. The method according to claim 2, wherein said method further includes a step of indicating said multi-byte dataword is invalid, in response to any byte of said multi-byte dataword in said first extended interchange code falling outside the range of said corresponding one of said plurality of offset arrays.

4. The method according to claim 1, wherein said step of providing a plurality of offset arrays further includes a step of providing a first offset array having offset indices to each column of said conversion matrix and a second offset array having offset indices to each row of said conversion matrix.

5. The method according to claim 1, wherein said multi-byte dataword corresponds to a character of a written national language.

6. A computer system for converting a multi-byte dataword in a first extended interchange code to a multi-byte dataword in a second extended interchange code, comprising:

means for providing a plurality of offset arrays and a conversion matrix, wherein each entry in each of said plurality of offset arrays contains an offset index for indexing to said conversion matrix, wherein in each offset array, a difference between offset indices in each pair of adjacent entries is greater than one;

means for returning an index value for each byte of said multi-byte dataword in said first extended interchange code from a corresponding one of said plurality of offset arrays; and means for adding all of said returned index values to obtain said multi-byte dataword in said second extended interchange code from said conversion matrix.

7. The computer system according to claim 6, wherein said computer system further includes a means for verifying each byte of said multi-byte dataword in said first extended interchange code is within the range of said corresponding one of said plurality of offset arrays.

8. The computer system according to claim 7, wherein said computer system further includes a means for indicating said multi-byte dataword is invalid, in response to any byte of said multi-byte dataword in said first extended interchange code falling outside the range of said corresponding one of said plurality of offset arrays.

9. The computer system according to claim 6, wherein said means for providing a plurality of offset arrays further includes a means for providing a first offset array having offset indices to each column of said conversion matrix and a second offset array having offset indices to each row of said conversion matrix.

10. The computer system according to claim 6, wherein said multi-byte dataword corresponds to a character of a written national language.

11. A computer program product residing on a computer-usable medium for converting a multi-byte dataword in a first extended interchange code to a multi-byte dataword in a second extended interchange code within a computer system, said computer program product comprising:

program code means for providing a plurality of offset arrays and a conversion matrix, wherein each entry in each of said plurality of offset arrays contains an offset index for indexing to said conversion matrix, wherein in each offset array, a difference between offset indices in each pair of adjacent entries is greater than one;

program code means for returning an index value for each byte of said multi-byte dataword in said first extended interchange code from a corresponding one of said plurality of offset arrays; and program code means for adding all of said returned index values to obtain said multi-byte dataword in said second extended interchange code from said conversion matrix.

12. The computer program product according to claim 11, wherein said computer program product further includes a program code means for verifying each byte of said multi-byte dataword in said first extended interchange code is within the range of said corresponding one of said plurality of offset arrays.

13. The computer program product according to claim 12, wherein said computer program product further includes a program code means for indicating said multi-byte dataword is invalid, in response to any byte of said multi-byte dataword in said first extended interchange code falling outside the range of said corresponding one of said plurality of offset arrays.

14. The computer program product according to claim 11, wherein said program code means for providing a plurality of offset arrays further includes a program code means for providing a first offset array having offset indices to each column of said conversion matrix and a second offset array having offset indices to each row of said conversion matrix.

15. The computer program product according to claim 11, wherein said multi-byte dataword corresponds to a character of a written national language.

* * * * *